Oct. 6, 1970  C. L. BOWLING  3,531,842
CUT-OFF TOOL HOLDER
Filed Nov. 20, 1967

CARLTON L. BOWLING
INVENTOR

BY Browning, Simmons, Hyer & Eickenroht
ATTORNEYS

United States Patent Office 3,531,842
Patented Oct. 6, 1970

3,531,842
CUT-OFF TOOL HOLDER
Carlton L. Bowling, Houston, Tex., assignor to C. & L.
Machine Shop, Inc., Houston, Tex., a corporation of
Texas
Filed Nov. 20, 1967, Ser. No. 684,392
Int. Cl. B26d 1/00
U.S. Cl. 29—96       13 Claims

ABSTRACT OF THE DISCLOSURE

The cut-off tool holder is formed of a body having a tang for attaching the tool holder to the tool post of a machine tool. A longitudinal groove extends along the side of the body opposite the tang. A portion of the top wall of the longitudinal groove is inclined at an acute angle with respect to the bottom wall. A pocket is located in the body adjacent the inclined portion of the top wall. A support blade is positioned in the groove with its bottom mating with the bottom wall of the groove. A V-groove extends along the top wall of the support blade and a cutting bit having a V-shaped bottom wall is positioned therein. A clamping member positioned in the pocket has a lip portion extending between the top wall of the cutting bit and the angularly-inclined top wall portion of the groove. Threaded means are threadedly engaged with the clamping member to draw lip portion of the clamping member into engaging contact with the top wall of the bit and the bottom wall of the bit into engaging contact with the support blade to securely retain them in the groove. Reverse rotation of the threaded means withdraws the clamping means from locking engagement. An adjustable stop and support blade retainer is located near the rear of the groove, to independently retain the support blade in position and provides a rear stop for positioning the cutting bit.

BACKGROUND OF THE INVENTION

This invention relates to cut-off tool assemblies and, more particularly, to a novel tool holder which, while rigidly securing a supporting blade and cutting bit during cutting operations, has means facilitating replacing the cutting bit.

Although originally grooving and parting operations were performed by a thin-bladed cut-off tool positioned in the standard tool post on the cross slide carriage of a lathe, for some time various types of cut-off tool holders have been used. In such tool holders the thin cut-off tool blade has generally been replaced by a support blade and a separate cutting bit. U.S. Pats. 2,416,975 and 2,846,756 illustrate commercial cut-off tool holders of this type.

Prior art cut-off tool holders are designed so that the cutting bit, which wears out through usage or hitting hard spots in the material, may be easily replaced; however, it is difficult and time consuming in some of the prior art cut-off tool holders to replace the support blade. Although during normal usage the cutting bit is the only element which wears out, there are occasions when due to an unknown hard spot in the rotating stock, the support blade is damaged along with the cutting bit. Therefore, it is desirable that the support blade also be easily replaceable. Further, it is preferable that the assembly be so designed that the support blade may be redressed and reused. It is also desirable that the tool holder be designed and constructed so that the forward projection of cutting bit and support blade may be easily adjusted and, once such position is set, it be retained during normal changing of the cutting bit.

It is also essential that a cut-off tool holder be so constructed that the cutting bit and the support blade are rigidly and solidly mounted at all times during the cut-off operation, so that all detrimental vibration or chatter is avoided. It is further desirable that the clamping means securing the cutting bit be easily withdrawn from engagement. Further, it is desirable that a positive stop be provided to limit rearward movement of the cutting bit and provide a positive repositioning location.

It is the purpose of the present invention to provide an improved and a novel cut-off tool holder in which the support blade and the cutting bit are rigidly supported by a clamping member which is mechanically moved into and out of clamping position, in which the rearward movement of the cutting bit is arrested by an adjustable stop, in which there is easy replacement of the cutting bit without disturbing the position of the support blade and the horizontal plane of the cutting edge of the cutting bit and its forward projection is maintained at the proper setting, in which the forward projection of the support blade and cutting insert may be easily adjusted to provide the proper depth of cut and which is so designed that the support blade may be redressed and reused.

SUMMARY OF THE INVENTION

The cut-off tool of the present invention is formed of a tool holder body provided with a longitudinal groove which receives the support blade and the cutting bit. A portion of the top wall of the groove is inclined at an acute angle with respect to the bottom wall and a pocket is located in the side wall of the groove adjacent the inclined portion of the top wall thereof. A clamping member is positioned in the pocket and has a lip portion interposed between the top wall of the cutting bit and the angularly-inclined portion of the top wall of the groove. There is a threaded passage in the body extending from the pocket which is axially aligned with a threaded passage in the clamping member. A double-threaded member is threadedly engaged with the threads in the clamping member and the body. Rotation of the threaded member in one direction moves the clamping member into the tight engagement between the top wall portion of the groove and top wall of the bit, thereby rigidly securing the cutting bit and the support blade in the longitudinal groove and opposite rotation moves the clamping member out of such tight engagement, thereby permitting changing of the cutting bit. An adjustable stop and support blade retainer is located along the top wall of the groove and independently retains the support blade in position and provides a repositioning point for the cutting bit.

With such construction, the cutting bit may be easily changed. If the support blade has been damaged, it may also be removed at the same time for redressing. If the support blade has not been damaged, it will remain in position, and, in conjunction with the adjustable stop, will properly align the horizontal level and forward projection of the cutting bit.

DESCRIPTION OF THE PREFERRED EMBODIMENT

Figure 1:
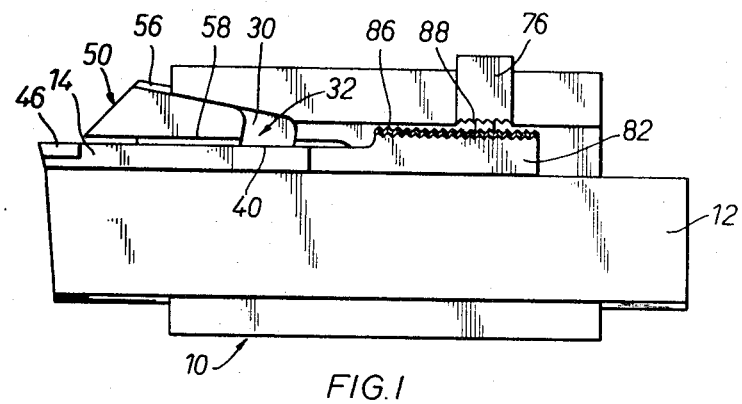
FIG. 1 is a front elevational view of the novel cut-off tool holder of the present invention prior to tight engagement of the clamping means between the groove and bit.
Figure 4:
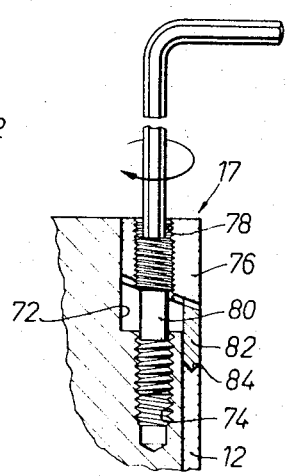
FIG. 4 is a sectional view taken generally along lines 4—4 of FIG. 2.

Referring now to the drawings wherein like parts in the various views will be designated by the same reference character, it can be seen that the cut-off tool holder of the present invention is generally comprised of a tool holder body 10 having front and rear ends, a cut-off blade which may be divided into a support blade 12 and a cutting bit 14, clamping means 16 which retain the cut-off blade on the body and adjustable stop and support blade retaining means 17 which provides a positive stop for rearward movement of the cutting bit and which independently retains the support blade in position during changing of the cutting bit.

The body 10 is provided with a mounting means by which the tool holder may be secured in the tool post of a machine tool, as is well known in the art. The mounting means may be a tang 18 or any of the various means customarily used for securing tool holder bodies to a tool post. A longitudinally extending groove 22 extends along the side of the body opposite tang 18. Groove 22 has a vertical side wall 24 and opposed top and bottom walls 26 and 28. Bottom wall 28 is inclined downwardly and inwardly with respect to side wall 24. A portion 30 of top wall 26 is inclined at an acute angle with respect to bottom wall 28 so as to converge toward the bottom wall from the front to the rear end of the body 10, and the remainder of the top wall extends parallel to the bottom wall. The surface of inclined portion 30 of the top wall is inclined upwardly and inwardly with respect to the side wall. Therefore, a portion of groove 22 is generally similar to a dovetail groove. A pocket 32 extends inwardly from the side wall 24 of the groove adjacent inclined top wall portion 30.

The support blade 12 is positioned in groove 22. The bottom wall 34 of blade 12 is angularly-inclined to mate with angularly-inclined bottom wall 28 of the groove. The support blade 12 is provided with a V-shaped top wall 36. As is well known in the art, the front edge 38 of support blade 12 may extend angularly to provide proper relief. As can be seen, the length of the support blade may be greater than the length of the tool body 10; therefore, if the support blade becomes damaged, the front edge may be redressed and the support blade re-used.

Positioned on top of the support blade 12 is cutting bit 14. As can be seen, cutting bit 14 has a V-shaped bottom wall 38 mating with V-shaped top wall 36 of support blade 12 and a flat top wall 40. To permit a certain amount of latitude in the width of cutting bit 14, side wall 24 of groove 22 may be provided with a relief 42 opposite the location of cutting bit 14. Cutting bit 14 may be provided with a pocket in which is permanently secured an insert 46 of hard cutting material such as carbide, which performs the actual cutting. The front end of cutting bit 14 and carbide insert 46 are provided with the proper rake angle as is well known in the art. The support blade 12 and the cutting bit 14 are rigidly retained in groove 22 by the novel clamping means 16 of the present invention.

Figure 2:
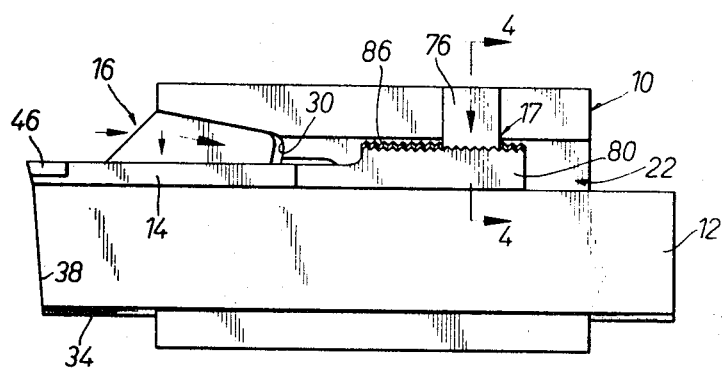
FIG. 2 is a view similar to FIG. 1 after tight engagement of the clamping means.
Figure 3:
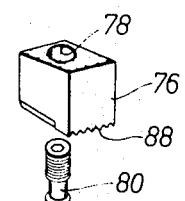
FIG. 3 is an exploded view of the assembly shown in FIGS. 1 and 2.

The clamping means 16 is comprised of a clamping member 50 which is positioned in pocket 32 and which, through cooperation with pocket 32 and angularly inclined top wall portion 30 clamps insert bit 14 and support blade 12 in groove 22. The pocket 32 has a top wall coincident with top wall portion 30 of the groove 22, a bottom wall parallel to its top wall, and a side wall extending perpendicularly between them and thus at an acute angle to the side wall 24 of groove 22. Clamping member 50 has a generally triangular cross section, the top, bottom and inner side walls of which mate with corresponding walls of pocket 32 and the outer side wall 52 of which provides a continuation of side wall 24 of groove 22. Clamping member 50 also has a lip portion 54 which extends over side wall 52. Lip portion 54 has an inclined upper wall 56 which mates with inclined top wall portion 30 of groove 22 and a flat bottom wall 58 for mating with flat top wall 40 of cutting bit 14. Movement of clamping member 50 horizontally toward the rear of tool body 10 causes flat bottom wall 58 of lip portion 54 to move vertically downward, see FIGS. 1 and 2. Such movement causes clamping member 50 to tightly engage and thereby exert pressure on the top wall of cutting blade 14, which is transmitted by the cutting bit to the support blade 12 forcing the bottom wall thereof into intimate contact with the bottom wall of groove 22. At the same time, inclined upper wall 56 of the lip portion 54 is forced into tight engagement with top wall portion 30 of groove 22. To provide additional support, clamping member 50 may have an inclined front side 59 which will extend the effective length thereof.

The above wedging-type of clamping action is particularly advantageous for cut-off tools since, once clamping member 50 is positioned, there is no tendency for it to become disengaged and, as the cut-off tool is fed into the work, either in a grooving or a cut-off operation, the cutting action on the tool will tend to force clamping member 50 back further in groove 22 tightening the clamping action on bit 14 and blade 12 and, therefore, maintaining cutting bit 14 and support blade 12 rigidly in groove 22. It has been found in practice that there is no chatter during the operation of the cut-off tool assembly herein described. It has been found that if the top and bottom walls of pocket 32 and angularly inclined top wall portion 30 are at an angle of 8°, there is sufficient downward movement during the longitudinal movement available to achieve a good clamping force without a sticking wedge problem.

In order to actuate the clamping action, driving means are provided to move the clamping member 50 rearwardly into its pocket 32. A passage 60 extends from the rear wall of pocket 32 through the body of the tool holder. A portion of passage 60 adjacent pocket 32 is provided with female threads 62. Clamping member 50 has a through passage 64, a portion of which is provided with female threads 66. Passages 60 and 64 are coaxial when clamping member 50 is located in pocket 32. Threaded portions 62 and 66 are of opposite hand and different pitch, for example threads 62 may be 24 threads to the inch right hand, and threads 66 may be 32 threads to the inch left hand. Threadedly engaged with threads 62–66 is double-threaded member 68 which is provided with rotative driving means such as recessed hex head 70 on each end whereby an Allen wrench may be inserted in clamping member passage 64 or body passage 60 to engage double-threaded member 68. Rotation of threaded member 68 in one direction will cause clamping member 50 to move into pocket 32 and rotation in the opposite direction will cause clamping member 50 to move out of pocket 32. Therefore, the clamping member is mechanically moved into and out of locking engagement.

Reverse rotation of double-threaded member 68 causes the clamping member 50 to be moved out of tight engagement between the pocket 32 and cutting bit, thereby permitting cutting bit 14 to be easily replaced. While the horizontal level for the cutting bit will be retained, the forward position of the cutting bit may be changed unless there is a positive relocating means. To prevent this, the assembly is provided with adjustable stop and support blade retainer 17.

A recess 72 is located in the top of the body intersecting groove 22 adjacent its rear end. A threaded passage 74 extends downward from the bottom wall of recess 72. A locking member or locking dog 76 is located in the recess. The dog has a threaded passage 78 which is axially aligned with threaded passage 74 when dog 76 is positioned in recess 70. The threads in passages 74 and 78 are of opposite hand. A double-threaded member 80 is threadedly engaged with passages 74 and 78 whereby rotation in one direction moves dog 76 downwardly and rotation in the opposite direction moves dog 76 upwardly. An adjustable stop member 82 having a V-shaped bottom wall 84 is positioned in the V-groove on the top wall of support blade 12. A portion of the top wall of adjustable stop member 82 is angularly inclined and is provided with notches 86. The bottom surface wall of dog 76 is similarly constructed and has slanted notches 88 which engage with notches 86 of stop member 82 to longitudinally position stop member 82. The slanted surfaces, plus the engagement of the V-shaped bottom wall 84 of stop member 82 with the V-shaped top wall of support blade 12, plus the engagement of angular bottom wall of support blade 12 with the bottom wall of groove 22 lockingly retains the support blade in position. Such construction independently retains the support blade in position while the cutting bit is being changed. Therefore, if only the cutting bit has to be replaced, the support blade remains in position. The stop member 82 provides a definite positive relocating means for the new cutting bit. Therefore, the forward projection of the new cutting bit will remain the same. The stop member will also prevent rearward movement of the cutting bit should someone forget to properly tighten the clamping member.

As can be seen, the present invention provides a cut-off tool holder which has a redressable support blade and separate cutting bit. The support blade and cutting bit are rigidly held in position by a clamping member which is mechanically engaged and disengaged. The mechanical disengagement greatly facilitates replacement of the cutting bit. The adjustable stop and support blade retainer provides a repositioning point for the cutting bit and also independently retains the support blade in position during replacement of the cutting bit thereby facilitating such replacement.

From the foregoing it can be seen that this invention is one well adapted to attain all the ends and objects hereinbefore set forth, together with other advantages which are obvious and which are inherent to the apparatus.

It will be understood that certain features and subcombinations are of the utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A cut-off tool assembly, comprising a body having a top and bottom, front and rear ends, and opposite sides, said body also having a groove in one side thereof including a side wall, a bottom wall and a top wall, a support blade supported in the groove on the bottom wall thereof, an insert cutting bit supported in the groove on top of the support blade adjacent the front end of the body, means for holding said bit tightly against the top of said support blade, a stop member supported in the groove on top of the support blade and rearwardly of the cutting bit, said stop member being movable longitudinally over the top of the support blade for engaging with the rear end of the bit in adjusted longitudinal positions of the bit, and means mounted on the body for urging the stop member downwardly against said support blade so as to lock said blade tightly against the bottom wall of the groove.

2. A cut-off tool assembly of the character defined in claim 1, wherein said urging means comprises a lock part guidably mounted on the body for vertical movement into and out of tight engagement with a top wall of the stop member, and means connecting the lock part to the body for movement therebetween.

3. A cut-off tool assembly of the character defined in claim 2, wherein the connecting means comprises a member having threads of opposite hand connecting, respectively, with threads on said lock part and body.

4. A cut-off tool assembly of the character defined in claim 2, wherein said lock part and top wall of the stop member have upwardly and inwardly inclined walls engageable with one another to urge the stop member inwardly against the side wall of the groove.

5. A cut-off tool assembly of the character defined in claim 2, wherein said lock part and top wall of the stop member have interengageable serrations for locking them against relative longitudinal movement.

6. A cut-off tool assembly of the character defined in claim 4, wherein said lock part and top wall of the retainer member have interengageable serrations for locking them against relative longitudinal movement.

7. A cut-off tool assembly, comprising a body having a top and bottom, front and rear ends, and opposite sides, said body also having a groove in one side thereof including a side wall, a bottom wall and a top wall, said top wall having a portion adjacent the front end of the body which converges toward the bottom wall from the front end of the body toward the rear end thereof, said top wall portion being inclined upwardly and inwardly and said bottom wall being inclined downwardly and inwardly, a support blade supported in the groove on the bottom wall thereof, the bottom wall of the support blade being inclined for mating with the bottom wall of the groove, an insert cutting bit supported on top of the top wall of the support blade adjacent the front end of the body, the bottom wall of the bit and top wall of the support blade having interfitting V-grooves, a wedge between the top wall portion of the groove and the top wall of the bit, means for urging said wedge toward the rear end of the body so as to tightly engage between the top wall portion of the groove and top wall of the bit, a stop member supported in the groove on the top wall of the support blade and rearwardly of the cutting bit, said stop member being movable longitudinally over the top wall of the support blade for engaging with the rear end of the bit in adjusted longitudinal positions of the bit, and means mounted on the body for urging the stop member downwardly against said support blade so as to lock said blade tightly against the bottom wall of the groove.

8. A cut-off tool assembly of the character defined in claim 7, wherein said urging means comprises a lock part guidably mounted on the body for vertical movement into and out of tight engagement with a top wall of the stop member, and means connecting the lock part to the body for movement therebetween.

9. A cut-off tool assembly of the character defined in claim 8, wherein said lock part and top wall of the stop member have interengageable serrations for locking them against relative longitudinal movement.

10. A cut-off tool assembly of the character defined in claim 8, wherein said lock part and top wall of the stop member have upwardly and inwardly inclined walls engageable with one another to urge the stop member inwardly against the side wall of the groove.

11. A cut-off tool assembly, comprising a body having a top and bottom, front and rear ends, and opposite sides, said body also having a dovetail groove in one side thereof with top and bottom wall portions which converge from the front end of the body toward the rear end thereof, a support blade supported in the dovetail groove on the bottom wall portion thereof, an insert cutting bit supported in the dovetail groove on the top of the support blade, a clamping member having a generally triangular portion supported in the dovetail groove between the top of the bit and the top wall of the dovetail groove, the top of the clamping member having a wall parallel to and engaging the top wall of the dovetail groove and a bottom wall parallel to the top wall of the bit, the assembly body having a pocket in the side wall of the groove and the clamping member having another portion guidably received in the pocket for movement in a direction parallel to the top wall portion of the groove, axially aligned passages through the body and said other portion of the clamping member, threads of opposite hand on adjacent ends of the passages, and a member threadedly engaged with each of said threads for positively moving said generally triangular portion of the clamping member toward and away from tight engagement between said top wall portion of the groove and top of the bit, said threaded member having parts on its opposite ends to permit manipulation from either end of the body.

12. A cut-off tool assembly of the character defined in claim 7, wherein the threads are of different pitch.

13. A cut-off tool assembly, comprising a body having a top and bottom, front and rear ends, and opposite sides, said body also having a groove in one side thereof including a side wall, a bottom wall and a top wall, a support blade supported in the groove on the bottom wall thereof, an insert cutting bit supported in the groove on top of the support blade adjacent the front end of the body, means for holding said bit tightly against the top of said support blade, a stop member supported in the groove above the support blade and rearwardly of the cutting bit, said stop member including means movable longitudinally of the support blade for engaging with the rear end of the bit in adjusted longitudinal positions of the bit, and means mounted on the body for urging the stop member downwardly against the top of said support blade so as to lock said blade tightly against the bottom wall of the groove.

References Cited

UNITED STATES PATENTS

| | | | |
|---|---|---|---|
| 2,275,326 | 3/1942 | Severson | 29—96 |
| 2,398,913 | 4/1946 | Anthony | 29—96 |
| 2,377,519 | 6/1945 | Rich | 29—96 |
| 2,390,653 | 12/1945 | Kilgore | 29—96 |
| 2,438,630 | 3/1948 | Barks | 29—96 |
| 2,644,224 | 7/1953 | Chilcott | 29—96 |
| 2,787,823 | 4/1957 | Kennicott | 29—96 |
| 3,316,617 | 5/1967 | Stein | 29—97 |

HARRISON L. HINSON, Primary Examiner